Figure 1:
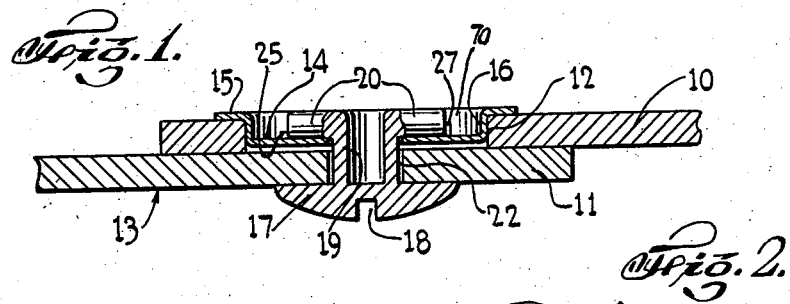

April 17, 1945.  F. VON OPEL  2,373,722
FASTENING DEVICE
Filed Feb. 20, 1942  3 Sheets-Sheet 1

INVENTOR.
FRITZ VON OPEL
BY
ATTORNEY

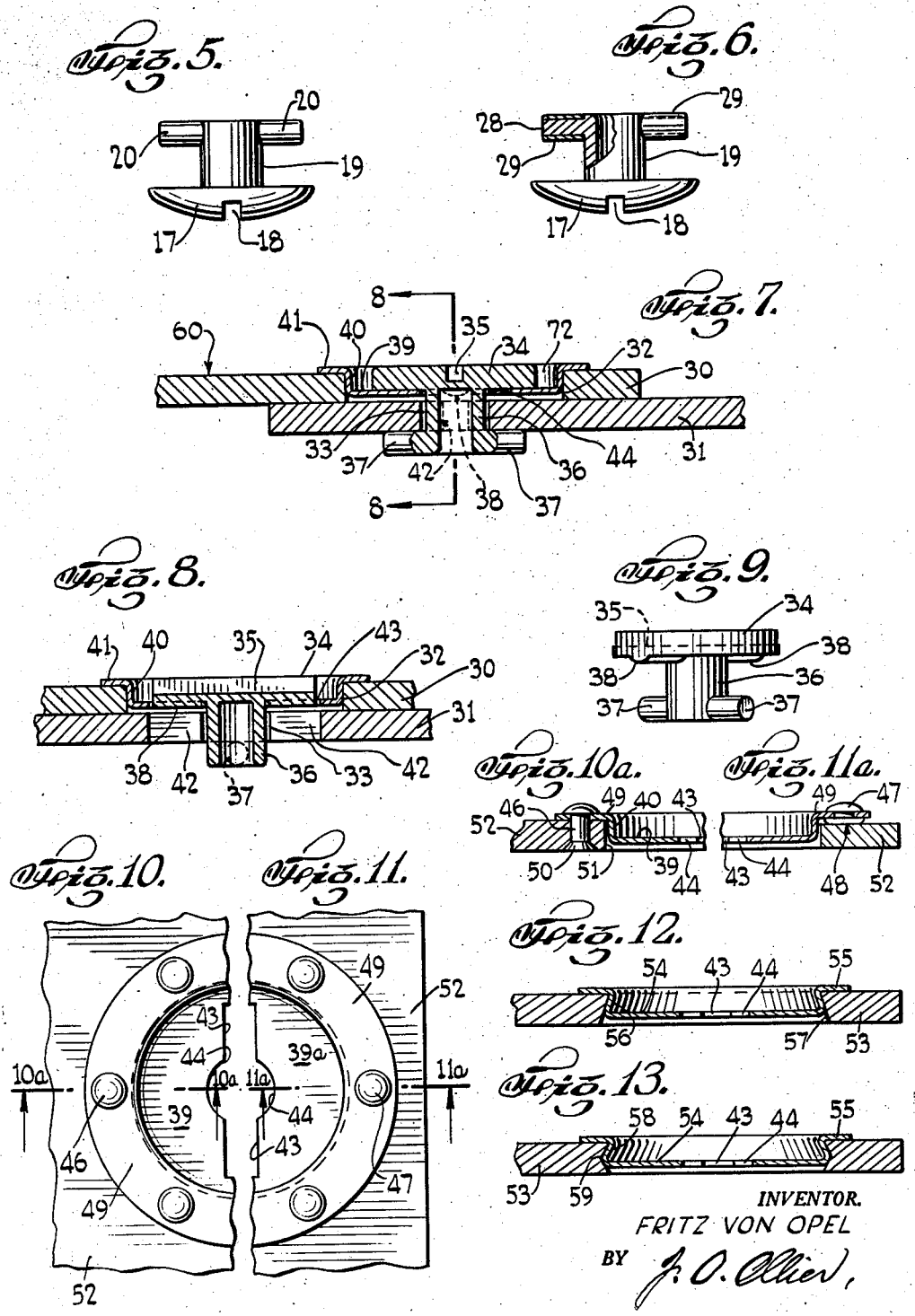

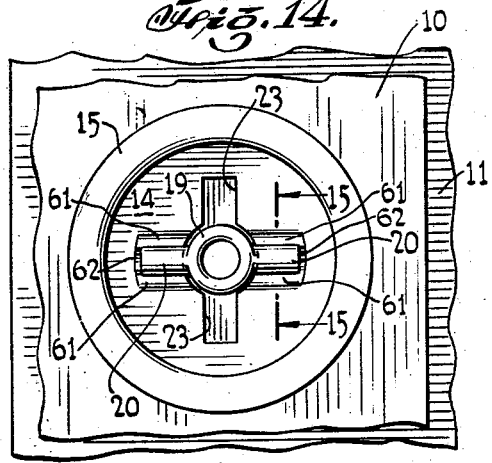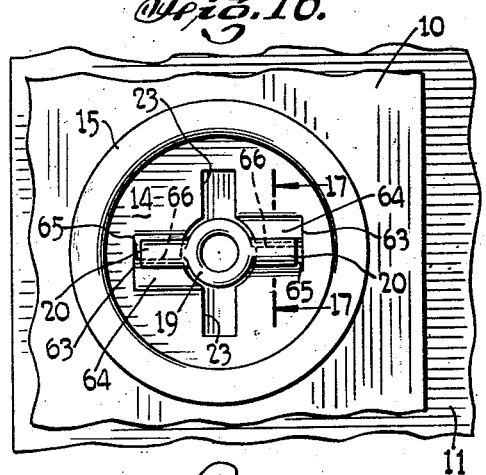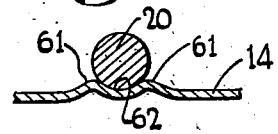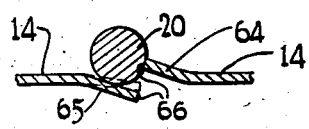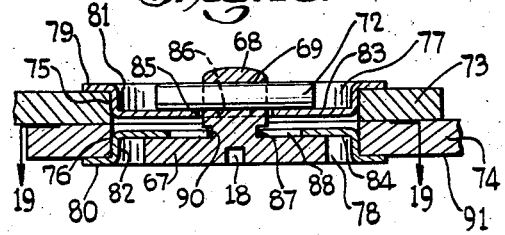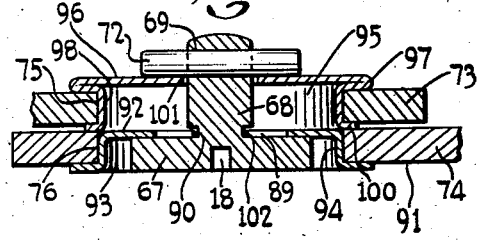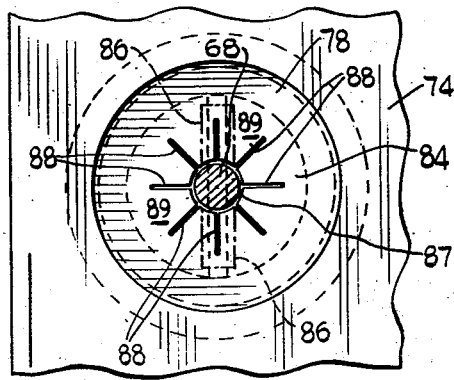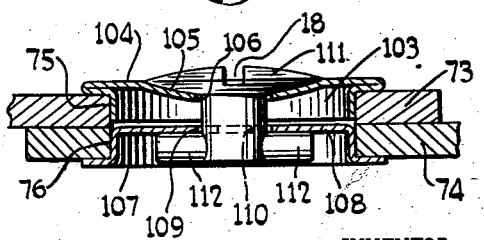

Patented Apr. 17, 1945

2,373,722

UNITED STATES PATENT OFFICE 2,373,722

FASTENING DEVICE

Fritz von Opel, New York, N. Y.; vested in the Alien Property Custodian

Application February 20, 1942, Serial No. 431,625

19 Claims. (Cl. 24—221)

This invention relates to fastenings, in particular removable fastenings to join two or more objects which are substantially flat at the joint, such as, e. g., plates or sheets of metal, laminated material, and the like, through substantially registering holes in them of equal or different sizes.

In particular the invention relates to removable fastenings for connecting a cover of any suitable shape with another object, such as, e. g., a cowling with the edge of a man hole or filling-in orifice of another hollow body, such as, e. g., a part of a wing or fuselage of an aircraft or the body of a vehicle.

More specifically the invention is concerned with removable fastenings for joining in a lap-joint two or more flat objects, such as, e. g., plates or sheets of metal, laminated plastic material, and the like, which are accessible only from one side.

It is an object of the invention to simplify the manufacture of the elements and their mounting used for fastenings of this type. It is another object of the invention to use shapes for the elements of the fastening which can be easily produced in inexpensive mass production and mounted in holes of regular shape, such as round shape.

It is a further object of the invention to use in fastenings of this type an intermediary member comprising a springy portion engaged by the fastener proper, which can be easily manufactured in mass production and equally easily mounted in a hole of the object to be joined to another one.

It is still a further object of the invention to use a member in fastenings of the type herein concerned which is springy at least at the place where the fastener proper engages it, and countersunk or dished, so that the engaging parts of the fastener proper do not, or at least not considerably project beyond the outer surface of the member or of the object in which the member is mounted.

It is still another object of the invention to provide an intermediary member for a fastening of the type concerned which engages the shank of the fastener in such a manner as to retain it in place and prevent its loss before or during assembly of the joint.

It is still a further object of the invention to use in fastenings of the type concerned an intermediary member which is springy at the place where it is engaged by the fastener in its locking position, and also provided with means or is shaped for securing the fastener in its locking position and, if desired, even to prevent any unlocking without destroying the joint.

These and other objects of the invention will be more clearly understood when the specification proceeds with reference to the drawings.

Figure 2:
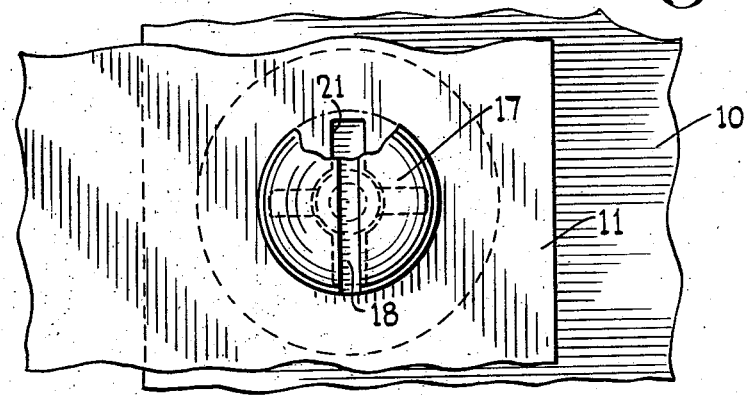
Figure 3:
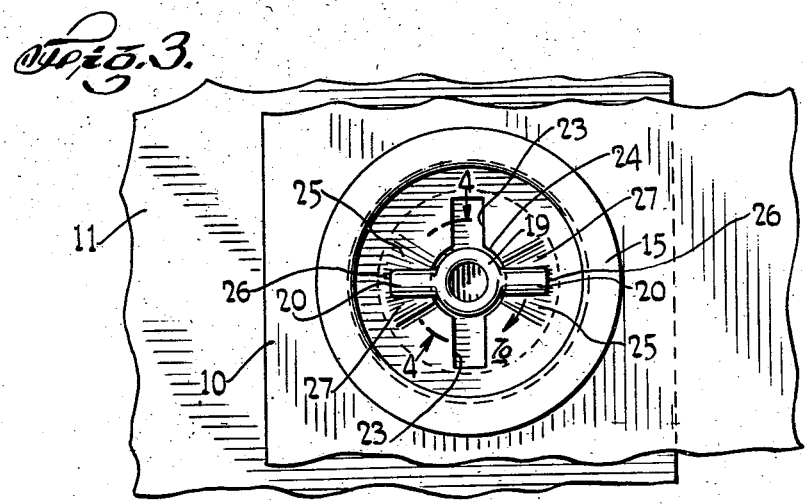
Figure 4:
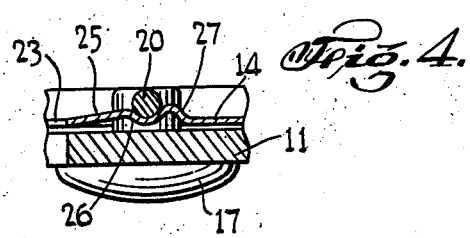

In the drawings, Fig. 1 shows in cross section and partly in elevation a joint incorporating the invention, Fig. 2 a plan view of the joint taken from its accessible lower side, with part of the head of the fastener broken away, Fig. 3 a plan view of the joint taken from its inaccessible side with the fastener in its locking position the same as shown in Fig. 1, Fig. 4 a cross section along lines 4—4 in Fig. 3, Fig. 5 in elevation a fastener, Fig. 6 in elevation and partly in cross section a modification of the fastener, Fig. 7 in cross section and partly in elevation a joint incorporating another feature of the invention, Fig. 8 a cross section along line 8—8 in Fig. 7, Fig. 9 a perspective view of a fastener used in the feature according to Figs. 7 and 8, Figs. 10 and 11 plan views from above and Figs. 10a and 11a cross sections along lines 10a—10a and 11a—11a in Figs. 10 and 11 of an intermediary member and its connection with one of the objects to be joined, Figs. 12 and 13 cross sections of other features of an intermediary member and one of the objects in which it is mounted, Fig. 14 a view from below (or the inaccessible side) and Fig. 15 a cross section along line 15—15 in Fig. 14 of a modification of the first described feature of the invention, Fig. 16 in plan view from the inaccessible side and Fig. 17 in cross section along line 17—17 in Fig. 16 of still another modification of the first described feature, Fig. 18 in cross section and Fig. 19 in plan view and partly in cross section taken along line 19—19 in Fig. 18 of another feature of the invention, and Figs. 20 and 21 in cross section with parts shown in elevation two modifications of the feature of the invention shown in Figs. 18, 19.

Referring to the exemplifications of the invention in Figs. 1 to 6, it will be seen that a fastener is used consisting of head 17 preferably of button-like shape, provided with a kerf 18, and shank 19. The shank may be solid or, in order to reduce its weight, hollow as illustrated in Fig. 1. At the free end of shank 19, projections or studs 20 are arranged which extend preferably to diametrically opposite sides and are preferably integral with the shank, as shown in Fig. 1.

The objects 10 and 11 to be joined by the fastener in a lap-joint, are illustrated as plates or sheets of metal, such as aluminum or aluminum alloy of any suitable composition. Holes 12 and 22 are provided respectively in plates 10 and 11; hole 12 is of larger diameter than hole 22.

A dish-like member 70 having a spring center portion 14, is forcibly fitted into hole 12. To this end, the side wall 16 of member 70 is so dimensioned that its outer surface either snugly fits into hole 12 or its outer diameter very slightly exceeds the inner diameter of hole 12. If wall 16 fits freely into hole 12, member 70 can be secured in the hole by rolling or reaming wall 16 against the edge of hole 12. Flange 15 of member 70 rests on the outer surface 13 of plate 10 when member 70 is driven into place.

Member 70 may be made of laminated material or sheet metal, particularly steel of a thickness, e. g., of about 1/16 to 1/32 of an inch, depending on the dimensions of hole 12 and the load on the fastening and in any event its center portion 14 is thin enough and/or so treated that it is springy for the purpose of the invention. It is understood that dish-like metallic members as described can easily be manufactured in inexpensive mass production, e. g., by punching the member from a sheet and preferably simultaneously dishing it, or molding laminated material. A fastener as shown in the drawings can also easily be made in mass production, e. g., by casting, drop-forging or the like and subsequent machining of any suitable metal, in particular aluminum or aluminum alloy of any suitable composition.

Member 70 is provided with a center hole 24 and communicating slots 23 on opposite sides. In the same way, hole 22 in plate 11 extends into slots 21 on opposite sides, and both the holes 22, 24 and slots 21, 23 are so dimensioned that shank 19 of the fastener with studs 20 can be passed through them with sufficient clearance when properly aligned.

The center portion 14 of the dish-like member is provided with hills 25 and dales 26 distant from slots 23, preferably in such a manner that the dales 26 are off-set against the slots 23 by about 90°. On the side of each dale 26 opposite to hill 25, a hill 27 of any desired shape is provided which projects upwardly to a greater extent than hill 25 and thereby forms a kind of stop. It will be appreciated that in punching and pressing to shape the dish-like member, also the hills and dales can be pressed into the sheet, particularly if hot pressing be applied and the springy condition of the center portion restored, if necessary, by subsequent quenching.

It may be supposed that plate 10 forms the outer wall of a hollow body such as a wing of an airplane or body of a vehicle and wall 11 forms the edge of a cover or cowling to be removably attached to wall 10 on its accessible outside 13. Before assembling the hollow body, holes 12 are drilled or punched into wall 10 at predetermined places and into each of them a dish-like member 70 is driven or mounted. The cover or cowling with holes 24 and slots 23 punched in is positioned upon the outside 13 of plate 10 so that one each of the holes 22 therein registers with a hole 12 each in plate 10 and slots 23 in each dish-like member register with the slots 21 of the aligned hole in plate 11. Thereupon a fastener is inserted from the accessible outside 13 in such a manner that the projections or studs 20 pass through the registering slots 21 and 23, whereupon by inserting a proper tool in kerf 18, the fastener is turned counter-clockwise and the projections 20 forced over the hills 25 (which yield resiliently due to the springiness of center portion 14) and eventually drop into the dales 26.

The dimensions of the fastener are such that its grip, i. e., the distance between adjacent surface portions of the projections 20 and the head 17 is preferably slightly smaller than the distance of the outer surface of center portion 14 (supporting studs 20) from the outer surface 13 of plate 11, so that the studs 20 in their fastening position in dales 26 press the latter and thereby center portion 14 slightly towards head 17 and thus cause resilient reactions in the center of the dish-like member. Thereby plates 10, 11 are pressed one against the other and secured against movement, rattling, etc.; any undesired unfastening is definitely prevented by the hills 25 and 27.

In order to unlock plate 11 from plate 10, again a tool is to be inserted in kerf 18 and the fastener to be turned in clockwise direction whereby projections 20 press down the hills 25 and glide over them until a position is reached in which the projections 20 register with slots 23 (and 21); in this position the fastener falls down or can be withdrawn.

It will be appreciated that it depends primarily on the slope of hill 25 towards dale 26 and also upon the shape of the latter whether or not the projections 20 can be removed from the dales after they once entered them. If the slope is gradual and the dale not too deep, unfastening due to shocks can be securely prevented but is possible if due force is applied to turn the fastener. If the slope is steep, even forcible turning of the projections 20 out of the dales 26 can be prevented and in such case, permanent fastening is accomplished.

By making head 17 as flat as possible its air resistance can be reduced to any desired extent. The same purpose can also be served by properly rounding the outer surface of the head.

In order to facilitate moving the projections 20 over the hills 25 of the center portion of the dish-like member, particularly when frequent fastening and unfastening in operation is to be effected, the projections may be composed of shaft-like portions 28, Fig. 6, preferably integral with shank 19, and sleeves 29 thereon, made for instance of a self-lubricating bearing material, such as a porous metal composition the pores of which are either soaked with oil or permanently filled with graphite. Sleeves 29 may snugly fit upon projections 28 or be capable of revolving around them.

In Figs. 7 to 9 another feature of the invention is illustrated in which it is assumed that the objects or plates 30, 31, are accessible only from the side 60 and plate 30 forms for instance the edge of a cowling and plate 31 the wall of a hollow body. In this feature of the invention, the dish-like member 72 consists substantially of a springy center portion 39, an approximately cylindrical side wall 40 and a flange 41, and is forcibly fitted into the hole 32 of plate 30 which is accessible from the outside 60 while in the first exemplification of the invention according to Fig. 1, it was assumed that the dish-like member is fitted into a plate which is not accessible. A center hole 44 in center portion 39 communicates with slots 43 extending to opposite sides.

Plate 31 is provided with a center hole 33 communicating with slots 42 on opposite sides thereof; the slots both in the member and in plate 31 are in alignment when plates 30, 31 are positioned one upon the other for effecting the joint.

The fastener proper consists of a flat head 34 with kerf 35, shank 36 and projections 37 preferably integral with it and extending to opposite sides. As to be seen particularly from Fig. 9, smoothly rounded projections or keys 38 are provided on the lower surface of head 34, the upper surface of which is preferably flush with that of flange 41.

In assembling the joint, plate 30 is properly positioned upon plate 31 so that holes 44 and 33 as well as slots 42, 43 are aligned, the fastener is inserted from the accessible side 60 and its projections 37 passed through the registering slots 43, 42. A tool is then inserted into kerf 35, pressure exerted upon it so that the springy center portion 39 yields and projections 37 can be turned over the lower inaccessible surface of plate 31. After the fastener has thus been turned by about 90° in one or the other direction, the keys 38 come into alignment with and drop into the slots 43 whereby the springy center portion 39 is somewhat though not entirely released. As a result, the objects 30, 31 are joined by the fastener as well as friction caused between them by the elastic strain produced in the springy center portion 39; the fastener is locked in its position by the keys 38 engaging the slots 43. Unlocking can be effected by returning the fastener in its initial position by means of a tool inserted in kerf 35. It will be appreciated, however, that by shaping the keys 38 differently than shown in Fig. 9, particularly giving them a rectangular cross section instead of the rounded one shown, the keys when once dropped into slots 43 cannot be removed from them any more by simply turning the fastener, and thus a permanent lock can be effected.

It has been assumed in the above exemplifications of the invention that the dish-like member is secured in holes 12 or 32 by tight or forced fit. Instead, the position of the member may also be secured by welding or soldering, e. g., flange 15 or 41 to plate 10 or 30. In such a case the side walls 16 or 40 need not tightly fit the hole in the plate but may be slightly spaced from it.

The dish-like member may also be riveted to one of the plates, as shown in Fig. 10, 10a, where the dish-like member comprises a springy center portion 39 with center hole 44 and slots 43, a side wall 40 somewhat spaced from hole 51 in plate 52, and a flange 49. Rivets 46 for securing the dish-like member to plate 52 may either be fitted into corresponding bores of flange 49 and plate 52 and provided with a counter-sunk head 50 as shown in Figs. 10 and 10a, or short rivets 47 may be inserted in bores of flange 49 only in the manner shown in Figs. 11 and 11a and soldered or welded at 48 to plate 52. The latter feature offers the advantage that no bores are to be drilled or punched into plate 52, and that the dish-like member can be conveniently soldered or welded onto plate 52 by choosing a material for rivets 47 which is weldable or solderable at relatively low temperature, while the sheet metal of the dish-like member may be such that it either cannot be welded or soldered at all or is detrimentally affected thereby, particularly losing its springiness if high temperature heat for welding or soldering were to be applied to its flanges.

It is understood that instead of a simple drive-fit shown in Figs. 1 and 7, more rigid fits may be used as exemplified in Figs. 12 and 13. In Fig. 12, a truncated hole 57 is provided in plate 53, and the dish-like member having a springy center portion 54 and flange 55 is provided with a truncated side-wall 56 which, upon driving the member into place, fits the truncated hole 57. In this case also wall 56 should be somewhat resilient. The slopes of the truncated wall and hole are exaggerated in Fig. 12 for better illustrating them. For similar purposes the hole 59, Fig. 13, may be dove-tailed in cross section and wall 58 of the dish-like member be shaped correspondingly, whereby the member is tightly held in place and also an additional seat provided to that formed by flange 55. 44 is a center hole and 43 slots in the dish-like member, the same as illustrated in Figs. 7 to 11.

Instead of using somewhat springy side walls 56, 58 they may be initially, e. g., cylindrical and pressed into the holes 57, 59 by suitably shaped tools, e. g., in a rolling-in or other deforming operation; in such case any desired incline of the slope or crosssectional shape of the holes can be applied.

Referring to Figs. 14 and 15, the feature shown therein differs from that shown in Figs. 1 to 4 in that the springy center portion 19 of the dish-like or cup shaped member 14 is provided with hills 61, 61 of substantially equal shape on both sides of dale 62 so that stud 20 can be driven into dale 62 from both sides and not, as shown particularly in Fig. 4, only from one side. Moreover, the bottom of dale 62 is somewhat raised above the upper surface of the remaining center portion 19, whereby the elastic pressure by which stud 20 is held in position under otherwise equal conditions is increased to any desired extent. In other words, if the grip of the fastener and the thickness of the plates 10, 11, as well as the depth of the dished portion of member 70 are the same, the elastic pressure by which plates 10, 11 are pressed one against the other and the friction between them caused thereby will be considerably larger with the feature of the invention illustrated in Figs. 14, 15 than with that according to Figs. 1 to 4. Inversely, if the same pressure and friction is desired between plates 10, 11 in the above two features of the invention, the grip of the fastener used in the feature according to Figs. 14, 15 should be larger than in the feature according to Figs. 1 to 4.

Referring to the feature of the invention illustrated in Figs. 16, 17, it will be seen that the springy center portion 14 is cut in along lines 63, 63, as well as 66, 66, resulting in two flaps 64, 65, one of which, 64, is slightly bent upwardly while the other one, 65, is either slightly bent downwardly as shown in dotted lines in Fig. 17, or left in its position flush with the remaining part of center portion 14. When the fastener is inserted in the way described with reference to Figs. 1 to 4 and turned in counter-clockwise direction, eventually studs 20 arrive in the position shown in Figs. 16, 17 and abut against the edge of the upwardly bent flap 64 which acts as a stop, while flap 65 is bent down in the position shown in full lines in Fig. 17 and thereby causes desired elastic reactions in the flap. Thus again the fastener is locked in its fastening position, and plates 10, 11 are resiliently pressed one against the other. The fastener can be removed by forcibly rotating it back in clock-wise direction until studs 20 register with slots 23.

It will be appreciated that the shallow dale 62, in Figs. 14, 15 can easily be manufactured simultaneously with punching and dishing member 70. The same way, cutting in the center portion 14 along lines 63, 63 and 66, 66 as well as bending upwardly and downwardly, respectively, flaps 64, 65 can be combined with punching and shaping member 70.

Referring to the feature of the invention shown in Figs. 18, 19, a fastener is shown there which consists of a preferably flat head 67 with kerf 18 and solid bolt 68 provided with a bore 69 in which a pin 72 is tightly fitted.

It should be understood that this type of fastener can equally be used with all the other features of the invention herein illustrated.

Plates 73, 74 are provided with holes 75, 76 of equal diameter which offers the advantage that the same plunger or borer can be used for making the holes and furthermore two or more plates can be piled up in alignment and punched or bored simultaneously.

In each of the holes 75, 76 members 77, 78 are tightly fitted in any suitable way, particularly as previously described, and each comprises flanges 79, 80, side walls 81, 82 and springy center portions 83, 84.

Member 77 on the inaccessible side of the joint is provided with a center hole 85 extending in slots 86 the same way as shown for similar members in the other features of the invention. The springy center portion 84 of member 78 is provided with a center hole 87 and is radially cut in at 88 so that flaps 89 result. Shank 68 is provided with an annular groove 90 engaged by the projecting edges of flaps 89.

This joint is assembled in the following manner.

Before plates 73, 74 are positioned one on top of the other the dished members 77, 78 are driven or otherwise secured in hole 75, 76, respectively; shank 68 is pressed through hole 87 of member 78 whereby the flaps 89 yield but, as soon as head 67 is about to contact center portion 84, jump into the angular groove 90; thereafter pin 72 is driven into bore 69, and plate 74 with member 84 and the fastener are ready for handling. It will be appreciated that thus the plate with member 84 and fastener mounted therein can be shipped, moved, etc., without the danger of losing the fastener or any part of it.

It will be further appreciated that this connection of the fastener with the dished member can also be used with other features of the invention illustrated herein.

Now plates 73 and 74 are aligned, pin 72 being in such a position that it can pass through the slots 86 of the other member 77 whereupon a tool is inserted into kerf 18 and the fastener turned in one or the other direction. Thereby the springy center portions 83, 84 are deformed to desired extent and elastic reactions caused in them which secure the joint of plates 73, 74. For simplicity's sake, dales and hills or other means shown in other illustrations of the invention for preventing pin 72 from unlocking are not shown with respect to member 77, but are of course applicable.

It will be further understood that pin 72 can be made thinner and shank 68 shorter, or members 77 and 78, or either of them dished deeper so that no part of the fastener projects beyond plate 73. Again head 67 is flat enough so as not to project beyond a plane laid through the lower surface of flange 80.

It will also be understood that the purpose of the invention is served if only center portion 83 of member 77 is springy, while center portion 84 is not. The joint is accessible from side 91 so as to lock and unlock the fastening.

Referring to the feature shown in Fig. 20, two plates 73, 74 are joined from the side 91 by means of a fastener having a head 67 with kerf 18, shank 68, pin 72 forcibly driven into bore 69 and an annular groove 90 engaged by flaps 89 formed in the center portion 92 of a member 93 tightly fitted with its side wall 94 into hole 76 of plate 74. Hole 75 in plate 73 is preferably of the same diameter as hole 76. A member 95 having a springy center portion 96 and being folded at 97 to form a flange continued by wall 98, is inserted preferably with tight fit into hole 75 and the lower edge 100 spun over to secure member 95 in place. The center portion 96 is again provided with a center hole 101, and slots (not shown) which permit shank 68 and pin 72 to pass.

Before assembling plates 73, 74, the members 93, 95 are mounted in the holes 75, 76; shank 68 is passed through and secured in hole 102 formed by the inner edges of flaps 89 (as described with reference to Figs. 18, 19) and thereafter pin 72 driven into bore 69. Subsequently plates 73, 74 are positioned one upon the other, so that pin 72 and shank 68 can pass through hole 101 and the slots of the center portion 96, and the fastener is then turned by about 90° in one direction or the other into the position shown in Fig. 20 whereby the lock is closed. Center portion 96 and, if desired, center portion 92, are springy enough to cause elastic reactions therein when the fastener is in its locked position. Also in this case hills and dales or other means securing pin 72 in its locked position can be used as shown herein for other exemplifications of the invention.

In the feature of the invention shown in Fig. 21, plates 73, 74 are provided with holes 75, 76, preferably of equal diameter. A member 103 is mounted in hole 75, e. g., by drive fit and its center portion 104 provided with a countersunk part 105 having a hole 106 and slots (not shown).

Member 107 is also tightly fitted into hole 76 and provided with a springy center portion 108 having a hole 109 and slots 110 extending to opposite sides, the same way as shown in the other figures. The fastener is provided with a sunk head 111 fitting into the countersunk portion 105, and its shank is preferably integral with the projections 112.

From the foregoing it will be understood that first the members 103, 107 are mounted in plates 73, 74 thereafter the latter assembled and the fastener put into position by passing studs 112 through the slots in the center portions 105, 108 and the shank through holes 106, 109, whereupon the fastener is rotated by means of an instrument inserted in kerf 18 by about 90° in either direction and thereby the lock closed.

It is understood that the countersunk shape of member 103 and the slightly beveled head 111 of the fastener can be used in other features of the invention herein shown, if it is on the accessible outside of the objects to be joined.

From the above it will be realised that the invention substantially consists in that the two obbjects to be joined are provided with registering holes at least one of which is of considerably larger diameter than the shank of a fastener used for joining the objects, while the other hole is either of slightly or considerably larger diameter than the shank. In a hole of considerably larger diameter a dish-like or cup shaped member is secured either by tight fit or other suitable means, such as welding, soldering, riveting, and provided with a center hole and slots extending to opposite sides for permitting the shank and projections thereon to pass therethrough. The dish-like member comprises a springy center portion, and the grip of the fastener is such that after it has been turned into locking position, the center portion of a dish-like member is deformed to desired extent and thereby elastic reactions are caused therein which serve to press the objects to be joined one against the other. If the diameter of the hole in one of the objects is only slightly larger than that of the shank, the hole extends into slots registering with those in the member mounted in the other object, so that the shank with its projections can be passed therethrough. If the diameter of the hole in the other object is also considerably larger than the diameter of the shank, another preferably dish-like or cup shaped member is mounted in it and provided with a hole and slots to permit the shank with its projections to pass. It is immaterial for the principles of the invention whether the head of the fastener is resting on a rigid or more elastic part. It is further immaterial for the principles of the invention whether the head of the fastener is button-like, flat or sunk, or whether the fastener consists of one or two pieces as illustrated.

It is essential for the invention that at least one member is provided which is springy at least in its center portion, thereby securing the joint, and which can easily be made and shaped in mass production and equally easily mounted in a hole of one of the objects to be joined, and that such hole is also easily produced by punching, drilling, etc. Thereby the invention advantageously differs from other fastenings comprised of more complicated shapes of the cooperating members which also project beyond accessible sides of the joint exposed to air and thereby, if used for aircraft and other vehicles, increase the air resistance.

These and other advantages of the invention are to be realised from the foregoing exemplifications of the invention which is however not limited to them but to be derived in its broadest aspects from the appended claims.

What I claim is:

1. A fastening for joining at least two objects, such as plates or sheets, provided with aligned holes at the place where the fastening is to be applied and at least one of the holes having a considerably larger diameter than the shank of the fastener to be applied, comprising a member which is springy at the place to be gripped by the fastener and adapted to be mounted outside said place in a hole of said larger diameter, said member provided at said springy place with a hole and slots communicating therewith and extending to opposite sides, a fastener comprising a head and shank and projections near the free end of said shank, said shank and projections adapted to pass respectively through said hole and slots, the hole in the other object being shaped so as to permit only said shank and projections to pass therethrough, so that said fastener when passed with its shank and projections through said aligned holes and slots and turned for a predetermined minimum angle joins said objects, and the grip of said fastener defined by the distance of adjacent surface portions of its projections and head being such that resilient reactions are caused in the springy portion of said member in said joining position of the fastener.

2. A fastening for joining at least two objects, such as plates or sheets, accessible from one side only and provided with holes being in alignment when the objects are joined, at least one of said holes being of considerably larger diameter than the shank of a fastener used for joining the objects, comprising a member which is springy at the place to be gripped by the fastener and outside said place engages and is mounted in a hole of said larger diameter, said member provided at said springy place with a hole and slots communicating therewith and extending to opposite sides, a fastener comprising a head and shank and projections near the free end of said shank, said shank and projections adapted to pass respectively through said hole and slots, the hole in the other object being shaped so as to permit only said shank and projections to pass therethrough, so that said fastener when passed from the accessible side of the objects with its shank and projections through said aligned holes and slots and turned for a predetermined minimum angle joins said objects, the grip of said fastener defined by the distance of adjacent surface portions of said projections and head being such that resilient reactions are caused in the springy place of said member in said joining position of the fastener, and means associated with said member for locking at least temporarily said projections in their joining position.

3. A fastening for joining at least two objects, such as plates or sheets, provided with aligned holes at the place where the fastening is to be applied and at least one of the holes having a considerably larger diameter than the shank of the fastener to be applied, comprising a unitary dish-like member having a springy center portion and flange, said member mounted in a hole of said larger diameter and said flange resting upon said portion of said object close to said hole, said center portion provided with a hole and slots communicating therewith and extending to opposite sides, a fastener comprising a head and shank and projections near the free end of said shank, said shank and projections adapted to pass respectively through said hole and slots, the hole in the other object being shaped so as to permit only said shank and projections to pass therethrough, so that said fastener when passed with its shank and projections through said aligned holes and slots and turned for a predetermined minimum angle joins said objects, and the grip of said fastener defined by the distance of adjacent surface portions of its projections and head being such that resilient reactions are caused in said center portion in said joining position of the fastener.

4. A fastening for joining at least two objects, such as plates or sheets, provided with aligned holes at the place where the fastening is to be applied and at least one of the holes having a considerably larger diameter than the shank of the fastener to be applied, comprising a unitary dish-like member of sheet material having a springy center portion and a side wall, the dished center portion arranged within a hole of said larger diameter and said side wall fitted into said hole, said center portion provided with a hole and slots communicating therewith and extending to opposite sides, a fastener comprising a head and shank and projections near the free end of said shank, said shank and projections adapted to pass respectively through said hole and slots, the hole in the other object being shaped so as to permit only said shank and projections to pass therethrough, so that said fastener when passed with its shank and projections through said aligned holes and slots and turned for a predetermined minimum angle joins said objects, and the grip of said fastener defined by the distance of adjacent surface portions of its projections and head being such that resilient reactions are caused in said center portion in said joining position of the fastener.

5. A fastening for joining at least two objects, such as plates or sheets, comprising a fastener substantially consisting of a head and shank and projections near the free end of said shank extending to opposite sides, each of said objects being fabricated to permit said shank and projections only to pass through said objects, by each object being provided with a hole and slots communicating therewith and extending to opposite sides so as to permit said shank and projections to pass therethrough, at least one of said holes and its slots being arranged in a member which is springy adjacent to said hole and its slots and which is mounted in a hole in one of said objects, of larger size than that of the hole and slots in said member, so that said fastener when passed with its shank and projections through the aligned holes and slots provided in said objects, and turned by a predetermined minimum angle joins said objects, and the grip of said fastener defined by the distance of adjacent surface portions of its projections and head being smaller than the initial distance between the surface portions to be contacted respectively by the head and projections of the fastener, so that the fastener in its joining position causes resilient reactions in the springy portion of said member.

6. A fastening for joining at least two objects, such as plates or sheets, comprising a fastener substantially consisting of a head and shank and projections near the free end of said shank extending to opposite sides, each of said objects being fabricated to permit said shank and projections only to pass through said objects, by each object being provided with a hole and slots communicating therewith and extending to opposite sides so as to permit said shank and projections to pass therethrough, at least one of said holes and its slots being arranged in a member which is springy adjacent to said hole and its slots and which is mounted in a hole in one of said objects, of larger size than that of the hole and slots in said member, so that said fastener when passed with its shank and projections through the aligned holes and slots provided in said objects and turned by a predetermined minimum angle joins said objects, the grip of said fastener defined by the distance of adjacent surface portions of its projections and head being smaller than the initial distance between the surface portions to be contacted respectively by the head and projections of the fastener, so that the fastener in its joining position causes resilient reactions in the springy portion of said member, and means for locking at least temporarily said projections in their joining position.

7. A fastening for joining at least two objects, such as plates or sheets, comprising a fastener substantially consisting of a head and shank and projections near the free end of said shank extending to opposite sides, sleeves on said projections, each of said objects being fabricated to permit said shank and projections only to pass through said objects, by each object being provided with a hole and slots communicating therewith and extending to opposite sides so as to permit said shank and projections to pass therethrough, at least one of said holes and its slots being arranged in a unitary dish-like member which is springy adjacent to said hole and its slots and which is mounted in a hole in one of said objects, of larger size than that of the hole and slots in said member, so that said dish-like portion is sunk into said hole and said fastener when passed with its shank and projections through the aligned holes and slots provided in said objects and turned by a predetermined minimum angle joins said objects, and the grip of said fastener defined by the distance of adjacent surface portions of its projections and head being smaller than the initial distance between the surface portions to be contacted respectively by the head and projections of the fastener, so that the fastener in its joining position causes resilient reactions in the springy portion of said member.

8. A fastening for joining at least two objects, such as plates or sheets, comprising a fastener substantially consisting of a head and shank and projections near the free end of and integral with said shank and extending to opposite sides, each of said objects being fabricated to permit said shank and projections only to pass through said objects, by each object being provided with a hole and slots communicating therewith and extending to opposite sides so as to permit said shank and projections to pass therethrough, at least one of said holes and its slots being arranged in a member which is springy adjacent to said hole and its slots and which is mounted in a hole in one of said objects, of larger size than that of the hole and slots in said member, so that said fastener when passed with its shank and projections through the aligned holes and slots provided in said objects, and turned by a predetermined minimum angle joins said objects, and the grip of said fastener defined by the distance of adjacent surface portions of its projections and head being smaller than the initial distance between the surface portions to be contacted respectively by the head and projections of the fastener, so that the fastener in its joining position causes resilient reactions in the springy portion of said member.

9. In a fastening as described in claim 6, said means for at least temporarily locking said projections in their joining position consisting in abutments, as exemplified by hills, associated with the springy portion of said member and arranged at least on one side of each projection in their joining position.

10. In a fastening as described in claim 6, said means for at least temporarily locking said projections in their joining position consisting in hills, as exemplified by a key, associated with the inside of said head and arranged to engage the slots through which said projections have been passed after said fastener has been turned into its joining position.

11. A fastening for joining at least two objects, such as plates or sheets, accessible from one side only and provided with holes in alignment when the objects are joined, comprising a fastener substantially consisting of a head and shank and projections near the free end of said shank and extending to opposite sides thereof, a unitary dish-like member having a springy center portion provided with a hole and slots communicating therewith and extending to opposite sides, permitting said shank and projections to pass therethrough, said member mounted outside said center portion in a hole of corresponding size in the inaccessible one of the objects to be joined, the hole in the other object being shaped so as to permit only said shank and projections to pass therethrough, so that said fastener when passed from the accessible side of the objects with its shank and projections respectively through said aligned holes and slots and turned by a predetermined minimum angle joins said objects, and the grip of said fastener defined by the distance of adjacent surface portions of said projections and head being smaller than the initial distance between the surface of said member and object to be contacted respectively by said head and projections, so that resilient reactions are caused in said springy portion when the fastener is turned into its joining position.

12. A fastening for joining at least two objects, such as plates or sheets, accessible from one side only and provided with holes in alignment when the objects are joined, comprising a fastener substantially consisting of a head and shank and projections near the free end of said shank and extending to opposite sides thereof, a dish-like member having a springy center portion provided with a hole and slots communicating therewith and extending to opposite sides permitting said shank and projections to pass therethrough, said member mounted outside said center portion in a hole of corresponding size in the accessible one of the objects, so that its dish-like portion is sunk into said hole, said dish-like portion shaped and of a size to receive the head of said fastener, said head being shaped so as not to protrude beyond a plane laid through the accessible outside surface of said object or member mounted in said object, the hole in the other object being shaped so as to permit only said shank and projections to pass therethrough, so that said fastener when passed from the accessible side of the objects with its shank and projections respectively through said aligned holes and slots and turned by a predetermined minimum angle joins said objects, and the grip of said fastener defined by the distance of adjacent surface portions of said projections and head being smaller than the initial distance between the surfaces of said member and object to be contacted respectively by said head and projections, so that resilient reactions are caused in said springy portion when the fastener is turned into its joining position.

13. A fastening for joining at least two objects, such as plates or sheets, comprising a fastener substantially consisting of a head, a shank and projections removably mounted near the free end of said shank extending to opposite sides thereof, said shank being provided with a recess, a disc mounted in each of said objects one of said discs having a hole so as to permit said shank to pass therethrough, the projections being removed therefrom, and the other disc having a hole and slots communicating therewith and extending to opposite sides so as to permit said shank and projections to pass therethrough, the latter disc being springy adjacent to said hole and slots and mounted in a hole of one of said objects of larger size than that of the hole and slots in said latter disc, the edge about the hole of the former disc being axially resilient as exemplified by flaps formed by radially slitting said edge, so that when said fastener is passed with its shank through the hole in said former disc said resilient edge engages said recess and when said fastener is passed with its shank and projections through the slots and hole formed in the latter disc and turned by a predetermined minimum angle, the fastener joins said objects, and the grip of said fastener defined by the distance of adjacent surface portions of its projections and head being smaller than the initial distance between the surface portions of the two discs to be contacted respectively by the head and projections of the fastener, the fastener in its joining position causes resilient reactions in the springy portion of said latter disc.

14. A fastening for joining at least two objects, such as plates or sheets, provided with holes which are aligned when the bodies are joined, substantially comprising a fastener essentially consisting of a head, shank and projections near the free end of said shank and extending to opposite sides thereof, and a unitary dish-like member having a flange and a springy center portion provided with a hole and slots communicating therewith and extending to opposite sides permitting said shank and projections to pass therethrough, said member mounted, outside said center portion, in one of said holes in the objects to be joined so that its flange rests on the object outside said hole, so that when said fastener is passed with its shank through the other hole in the objects to be joined, and its shank and projections through the hole and slots in the said member, and is turned for a predetermined minimum angle, it joins said objects, the said projections exerting pressure on one of said objects, and the said head exerting pressure on the other object, and the grip of said fastener defined by the adjacent surface portions of its projections and head is such that resilient reactions are caused in the springy portion of said member in said joining position of the fastener.

15. A fastening for joining two objects, such as plates or sheets, provided with holes which are aligned when the bodies are joined, substantially comprising a fastener essentially consisting of a head, shank and projections near the free end of said shank and extending to opposite sides thereof, said projections being formed by protruding parts of a pin tightly fitted within a hole of said shank near its free end, and a unitary disk-like member having a flange and a springy center portion provided with a hole and slots communicating therewith and extending to opposite sides permitting said shank and projections to pass therethrough, said member mounted, outside said center portion, in one of said holes in the objects to be joined, so that the flange rests on the object outside said hole, so that when said fastener is passed with its shank through the other hole in the objects to be joined, and its shank and projections through the hole and slots in the said member, and is turned for a predetermined minimum angle, it joins said objects, the said projections exerting pressure on one of said objects, and the said head exerting pressure on the other object, and the grip of said fastener defined by the adjacent surface portions of its projections and head is such that resilient reactions are caused in the springy portion of said member in said joining position of the fastener.

16. A fastening for joining two objects, such as plates or sheets, provided with holes which are aligned when the bodies are joined, substantially comprising a fastener essentially consisting of a truncated, countersunk head, shank and projections near the free end of said shank and extending to opposite sides thereof, and a unitary disk-like member having a springy center portion provided with a hole and slots communicating therewith and extending to opposite sides permitting said shank and projections to pass therethrough, said member mounted, outside center portion, in one of said holes in the objects to be joined, of corresponding size in the accessible side of the objects and provided with rims projecting beyond the circumference of said hole and resting on the accessible surface of the object, the springy portion of said member sunk into said hole in which it is mounted and shaped to receive said countersunk head, so that when said fastener is passed with its shank through the hole and slots in the said member, and is turned for a predetermined minimum angle, it joins the objects, the said projections exerting pressure on one of said objects, and the said head exerting pressure on the other object, and the grip of said fastener defined by the adjacent surface portions of its projections and head is such that resilient reactions are caused in the springy portion of said member in said joining position of the fastener.

17. A fastening for joining two objects, such as plates or sheets, provided with holes which are aligned when the bodies are joined, substantially comprising a fastener essentially consisting of a head, shank and projections near the free end of said shank and extending to opposite sides thereof, and a unitary disk-like member having a springy center portion provided with a hole and slots communicating therewith and extending to opposite sides permitting said shank and projections to pass therethrough, said member mounted, outside said center portion, in one of said holes in the objects to be joined, of larger size than that of the hole and slots in said member, said member being provided with a rim projecting beyond the circumference of the hole in which it is mounted, said rim being secured to the object by permanent means, such as a weld, a soldered seam, or rivets, so that when said fastener is passed with its shank through the other hole in the objects to be joined, and its shank and projections through the hole and slots in the said member, and is turned for a predetermined minimum angle, it joins said objects, the said projections exerting pressure on one of said objects and the said head exerting pressure on the other object, and the grip of said fastener defined by the adjacent surface portions of its projections and head is such that resilient reactions are caused in the springy portion of said member in said joining position of the fastener.

18. A fastening for joining two objects, such as plates or sheets, provided with holes which are aligned when the bodies are joined, substantially comprising a fastener essentially consisting of a head, shank and projections near the free end of said shank and extending to opposite sides thereof, and a unitary disk-like member having a springy center portion provided with a hole and slots communicating therewith and extending to opposite sides permitting said shank and projections to pass therethrough, said member mounted, outside said center portion, in one of said holes in the objects to be joined, of larger size than that of the hole and slots in said member, said member being provided with a rim projecting beyond the circumference of the hole in which it is mounted, said rim being provided with rivets of a material attachable to the object, as by welding or soldering, so that when said fastener is passed with its shank through the other hole in the objects to be joined, and its shank and projections through the hole and slots in the said member, and is turned for a predetermined minimum angle, it joins said objects, the said projections exerting pressure on one of said objects, and the said head exerting pressure on the other object, and the grip of said fastener defined by the adjacent surface portions of its projections and head is such that resilient reactions are caused in the springy portion of said member in said joining position of the fastener.

19. A fastening for joining two objects, such as plates or sheets, provided with holes which are aligned when the bodies are joined, substantially comprising a fastener essentially consisting of a head, shank and projections near the free end of said shank and extending to opposite sides thereof, and a unitary disk-like member having a springy center portion provided with a hole and slots communicating therewith and extending to opposite sides permitting said shank and projections to pass therethrough, said member mounted, outside said center portion, in one of said holes in the objects to be joined, of larger size than that of the hole and slots in said member, said member being provided with a rim projecting beyond the circumference of the hole in which it is mounted, and a side wall, said rim resting on one side of the object and said side wall arranged in the hole in which the member is mounted and having an edge spun over the other side of said object, so that when said fastener is passed with its shank through the other hole in the objects to be joined, and its shank and projections through the hole and slots in the said member, and is turned for a predetermined minimum angle, it joins said objects, the said projections exerting pressure on one of said objects, and the said head exerting pressure on the other object, and the grip of said fastener defined by the adjacent surface portions of its projections and head is such that resilient reactions are caused in the springy portion of said member in said joining position of the fastener.

FRITZ VON OPEL.